US012363676B2

(12) United States Patent
Zhang et al.

(10) Patent No.: US 12,363,676 B2
(45) Date of Patent: Jul. 15, 2025

(54) PAGING COORDINATION VIA THE INTERNET

(71) Applicant: QUALCOMM Incorporated, San Diego, CA (US)

(72) Inventors: Juan Zhang, Beijing (CN); Haris Zisimopoulos, London (GB); Hong Cheng, Basking Ridge, NJ (US); Miguel Griot, La Jolla, CA (US); Sebastian Speicher, Wallisellen (CH); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 17/759,629

(22) PCT Filed: Feb. 28, 2020

(86) PCT No.: PCT/CN2020/077077
§ 371 (c)(1),
(2) Date: Jul. 28, 2022

(87) PCT Pub. No.: WO2021/168766
PCT Pub. Date: Sep. 2, 2021

(65) Prior Publication Data
US 2023/0106205 A1   Apr. 6, 2023

(51) Int. Cl.
*H04W 68/02* (2009.01)
*H04W 8/18* (2009.01)
*H04W 60/00* (2009.01)

(52) U.S. Cl.
CPC ........... *H04W 68/02* (2013.01); *H04W 8/183* (2013.01); *H04W 60/00* (2013.01)

(58) Field of Classification Search
CPC ..... H04W 68/02; H04W 8/183; H04W 60/00; H04W 60/005; H04W 76/11; H04W 68/12; H04W 88/06
(Continued)

(56) References Cited

U.S. PATENT DOCUMENTS 10,667,238 B2   5/2020   Balasubramanian et al.
2020/0021970 A1   1/2020   Lu et al.
(Continued)

FOREIGN PATENT DOCUMENTS

| CN | 109479257 A | 3/2019 |
|---|---|---|
| EP | 3592059 A1 | 1/2020 |
| WO | 2018204099 | 11/2018 |

OTHER PUBLICATIONS

Intel., et al., "Solution for Handling of MT Service and Paging Reception with Push Notification", SA WG2 Meeting #S2-136AH S2-2001640, Jan. 17, 2020 (Jan. 17, 2020), 3 pages, section 6.X.2, figure 6.X.2-1.
(Continued)

Primary Examiner — Don N Vo
(74) Attorney, Agent, or Firm — Patterson & Sheridan, LLP

(57) ABSTRACT

Certain aspects of the present disclosure provide techniques for a UE with multiple universal subscription identity modules (i.e., a multi-USIM device) or concurrent radio access technology (C-RAT) capabilities to receive and respond to a page from a network of a first USIIM of the UE while not activating a receiver on that network by receiving the page (from the network of the first USIM) on a receiver active on a network of a second USIM. A method that may be performed by a user equipment (UE) includes sending a request to register for paging events in a registration request message to an access and management function (AMF) of a network of a first universal subscriber identifier module
(Continued)

(USIM) of the UE; sending a paging public user identifier (PPUID) of the UE, in a protocol data unit (PDU) session, to a paging server via a network of a second USIM of the UE, wherein the paging server is associated with the network of the first USIM; and receiving a message associated with the first USIM via the PDU session or another PDU session via the network of the second USIM.

19 Claims, 12 Drawing Sheets

(58) Field of Classification Search
USPC ........................................ 455/435.1
See application file for complete search history.

(56) References Cited

U.S. PATENT DOCUMENTS

| | | | |
|---|---|---|---|
| 2020/0045753 A1 | 2/2020 | Dao et al. | |
| 2022/0078742 A1* | 3/2022 | Tiwari | H04W 60/005 |
| 2022/0369280 A1* | 11/2022 | Ryu | H04W 68/02 |
| 2023/0093965 A1* | 3/2023 | Velev | H04W 68/12 |
| | | | 455/458 |
| 2023/0189208 A1* | 6/2023 | Kim | H04W 60/00 |
| | | | 370/329 |

OTHER PUBLICATIONS

Intel: "Solution for Handling of MT Service and Paging Reception with Push Notification", SA WG2 Meeting #S2-136, S2-1911098, Nov. 22, 2019 (Nov. 22, 2019), 3 pages, section 6.X.2, figure 6.X.2-1.
Intel: "Solution for Handling of MT Service and Paging Reception with Push Notification", SA WG2 Meeting #S2-136AH S2-2000165, Jan. 17, 2020 (Jan. 17, 2020), 3 pages, section 6.X.2, figure 6.X.2-1.
International Search Report and Written Opinion—PCT/CN2020/077077—ISA/EPO—Dec. 2, 2020.
3GPP TR 23.761: "3rd Generation Partnership Project, Technical Specification Group Services and System Aspects, Study on System Enablers for Devices Having Multiple Universal Subscriber Identity Modules (USIM) (Release 17)", 3GPP TR 23.761 V0.3.0, Mobile Competence Centre, 650, Route Des Lucioles, F-06921 Sophia-Antipolis Cedex, France, Jan. 28, 2020, XP051845692, pp. 1-37, Figures 6.1.3.1-1, p. 30-p. 35.
Supplementary European Search Report—EP20921674—Search Authority—Berlin—Oct. 19, 2023.

* cited by examiner

PAGING COORDINATION VIA THE INTERNET

CROSS-REFERENCE TO RELATED APPLICATIONS

This application is a national stage application under 35 U.S.C. 371 of PCT/CN2020/077077, filed Feb. 28, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for coordinating paging of a user equipment (UE) having two or more universal subscriber identity modules (USIMs) via the Internet.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved transmission resource utilization.

Certain aspects provide a method for wireless communication by a user equipment (UE). The method generally includes sending a request to register for paging events in a registration request message to an access and management function (AMF) of a network of a first universal subscriber identifier module (USIM) of the UE; sending a paging public user identifier (PPUID) of the UE, in a protocol data unit (PDU) session, to a paging server via a network of a second USIM of the UE, wherein the paging server is associated with the network of the first USIM; and receiving a message associated with the first USIM via the PDU session or another PDU session via the network of the second USIM.

Certain aspects provide a method for wireless communication by a paging server in a base station (BS). The method generally includes receiving a paging public user identifier (PPUID) of a user equipment (UE) in a protocol data unit (PDU) session, wherein the paging server is associated with a first universal subscriber identifier module (USIM) of the UE and wherein the PDU session is via a network of a second USIM of the UE; and sending, to the UE, a message associated with the first USIM via the PDU session or another PDU session via the network of the second USIM.

Certain aspects provide a method for wireless communication by an access and management function (AMF) in a base station (BS). The method generally includes receiving a request to register for paging events in a registration request message from a user equipment (UE) via a network of a first universal subscriber identifier module (USIM) of the UE; sending, in response to the request, an indication of a paging server to the UE; and sending, to the UE, a message associated with the network of the first USIM via the network of the second USIM.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
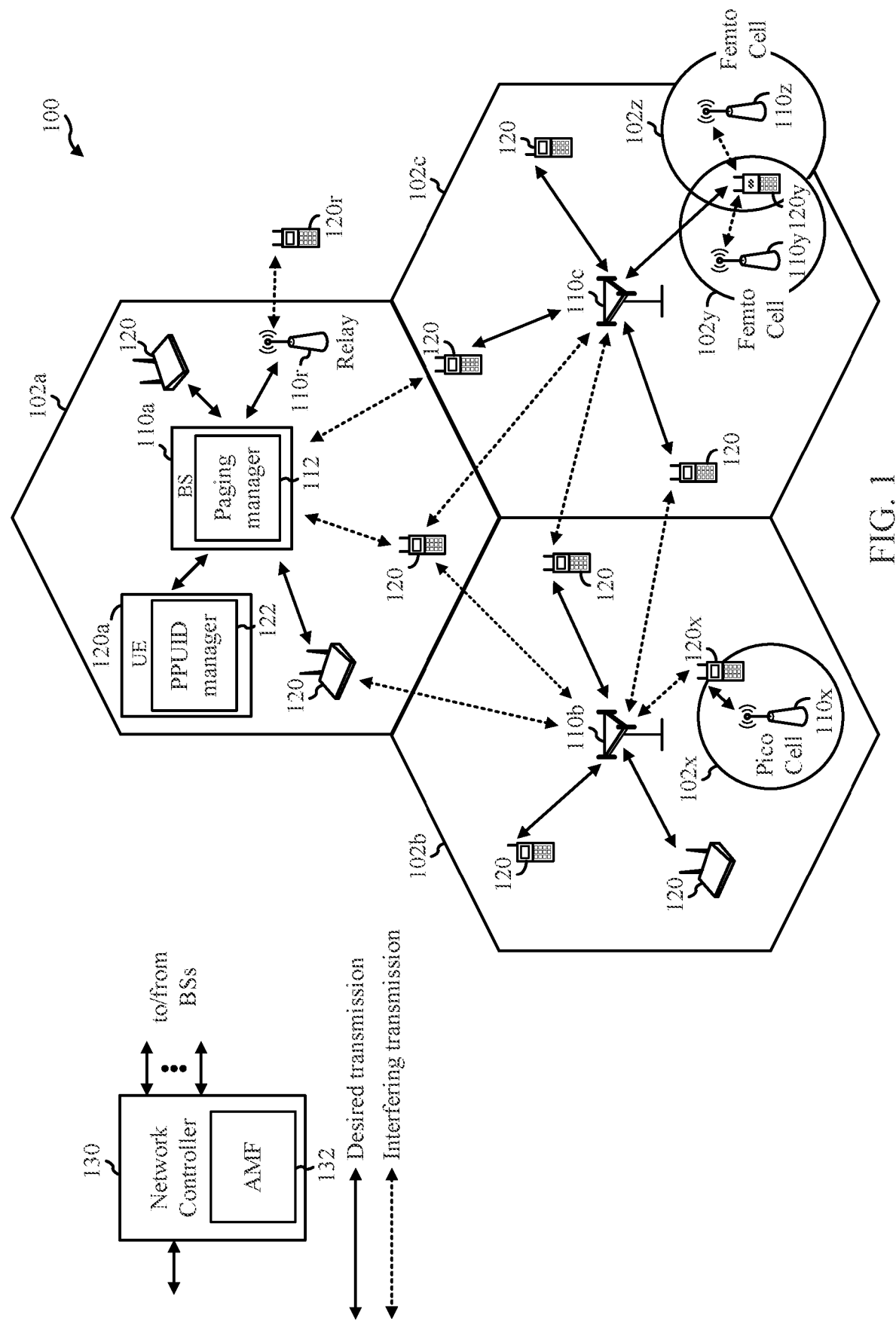
FIG. 1 is a block diagram conceptually illustrating an example telecommunications system, in accordance with certain aspects of the present disclosure.

Aspects of the present disclosure provide apparatus, methods, processing systems, and computer readable mediums for a UE with multiple universal subscription identity modules (i.e., a multi-USIM device) or concurrent radio access technology (C-RAT) capabilities to receive and respond to a page from a network of a first USIM of the UE while not activating a receiver on that network by receiving the page (from the network of the first USIM) on a receiver active on a network of a second USIM. C-RAT-capable UEs and multi-USIM UEs may not have the capability to receive data or signaling simultaneously on both access links. One important scenario is when the UE is in idle or inactive mode on a first network associated with a first USIM while the UE is in connected mode on a second network associated with a second USIM. In previously known techniques, the UE turns away from receiving downlink (DL) data on the second network to receive paging on the first network. In the described scenario, the UE cannot or does not prefer to be connected in both of the networks; this could be, for example, due to resource and/or capability restrictions of the UE. According to aspects of the present disclosure, a UE may receive paging from the first network via the second network, so the UE does not need to periodically turn away from the second network to receiving paging via the first network and thus the UE may avoid a potential service interruption on the second network.

The following description provides examples of techniques for multi-USIM devices to send a request to register for paging events in a registration request message to an access and management function (AMF) of a network of a first universal subscriber identifier module (USIM) of the UE and receive paging messages from the network of the first USIM via a network of a second USIM, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured to enable multi-USIM UEs to register a paging public user identifier (PPUID) with a network associated with a first USIM and receive pages and other messages from that network via a network associated with a second USIM. As shown in FIG. 1, the BS 110a includes a paging manager 112. The paging manager 112 may be configured to receive a paging public user identifier (PPUID) of a user equipment (UE) in a protocol data unit (PDU) session, wherein the paging server is associated with a first universal subscriber identifier module (USIM) of the UE and wherein the PDU session is via a network of a second USIM of the UE; and send, to the UE, a message associated with the first USIM via the PDU session or another PDU session via the network of the second USIM, in accordance with aspects of the present disclosure. In some examples, the paging manager 112 (e.g., a user data manager function) may determine the PPUID for the UE and provide the PPUID to the UE. The network controller 130 may include an access and mobility management function (AMF) that may be configured to receive a request to register for paging events in a registration request message from a user equipment (UE) via a network of a first universal subscriber identifier module (USIM) of the UE; to send, in response to the request, an indication of a paging server to the UE; and to send, to the UE, a message associated with the network of the first USIM via the network of the second USIM. While shown in the network controller 130, the AMF 132 may be located in a base station 110 or another network entity. As shown in FIG. 1, the UE 120a includes a PPUID manager 122. The PPUID manager 122 may be configured to send a request to register for paging events in a registration request message to an access and management function (AMF) of a network of a first universal subscriber identifier module (USIM) of the UE; send a paging public user identifier (PPUID) of the UE, in a protocol data unit (PDU) session, to a paging server (e.g., a paging server function in BS 110) via a network of a second USIM of the UE, wherein the paging server is associated with the network of the first USIM; and receive a message associated with the first USIM via the PDU session or another PDU session via the network of the second USIM, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
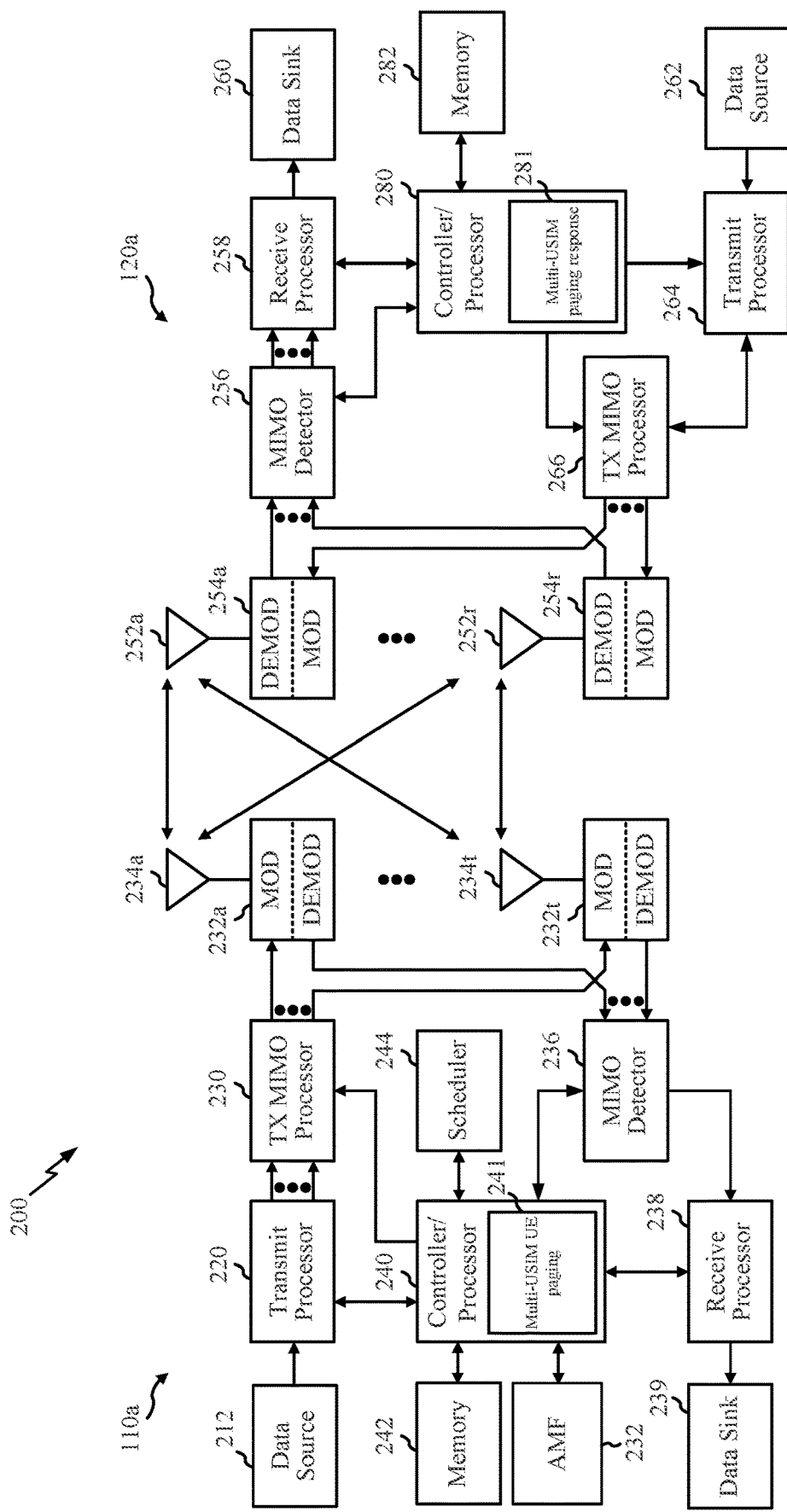
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 240 and/or other processors and modules at the BS 110a may perform or direct the execution of processes for the techniques described herein. For example, as shown in FIG. 2, the controller/processor 240 of the BS 110*a* has a paging manager 241 that may be configured for receiving a paging public user identifier (PPUID) of a user equipment (UE) in a protocol data unit (PDU) session, wherein the paging server is associated with a first universal subscriber identifier module (USIM) of the UE and wherein the PDU session is via a network of a second USIM of the UE; and for sending, to the UE, a message associated with the first USIM via the PDU session or another PDU session via the network of the second USIM, according to aspects described herein. The base station 110 may include an access and mobility management function (AMF) 232 that may be configured for receiving a request to register for paging events in a registration request message from a user equipment (UE) via a network of a first universal subscriber identifier module (USIM) of the UE; sending, in response to the request, an indication of a paging server to the UE; and sending, to the UE, a message associated with the network of the first USIM via the network of the second USIM. While shown in the BS 110, the AMF 132 may be located in another network entity or may be a software function running on the controller processor 240. As shown in FIG. 2, the controller/processor 280 of the UE 120*a* has a PPUID manager 241 that may be configured for sending a request to register for paging events in a registration request message to an access and management function (AMF) of a network of a first universal subscriber identifier module (USIM) of the UE; for sending a paging public user identifier (PPUID) of the UE, in a protocol data unit (PDU) session, to a paging server via a network of a second USIM of the UE, wherein the paging server is associated with the first USIM; and for receiving a message associated with the first USIM via the PDU session or another PDU session via the network of the second USIM, according to aspects described herein. Although shown at the controller/processor 280 and controller/processor 240, other components of the UE 120*a* and BS 110*a* may be used performing the operations described herein.

C-RAT-capable UEs and multi-USIM UEs may not have the capability to receive data or signaling simultaneously on both access links. One important scenario is when the UE is in idle or inactive mode on a first network associated with a first USIM while the UE is in connected mode on a second network associated with a second USIM. In previously known techniques, the UE turns away from receiving downlink (DL) data on the second network to receive paging on the first network. In the described scenario, the UE cannot or does not prefer to be connected in both of the networks; this could be, for example, due to resource and/or capability restrictions of the UE. According to aspects of the present disclosure, a UE may receive paging from the first network via the second network, so the UE does not need to periodically turn away from the second network to receiving paging from the first network and thus the UE may avoid a potential service interruption on the second network.

Accordingly, what is needed are techniques and apparatus for a UE with multiple universal subscription identity modules (i.e., a multi-USIM device) or concurrent radio access technology (C-RAT) capabilities to register a paging public user identifier to enable the UE be paged.
Example Paging Coordination via the Internet Aspects of the present disclosure provide apparatus, methods, processing systems, and computer readable mediums for a UE with multiple universal subscription identity modules (i.e., a multi-USIM device) or concurrent radio access technology (C-RAT) capabilities to receive and respond to a page from a network of a first USIM of the UE while not activating a receiver on that network by receiving the page (from the network of the first USIM) on a receiver active on a network of a second USIM.

Figure 3:
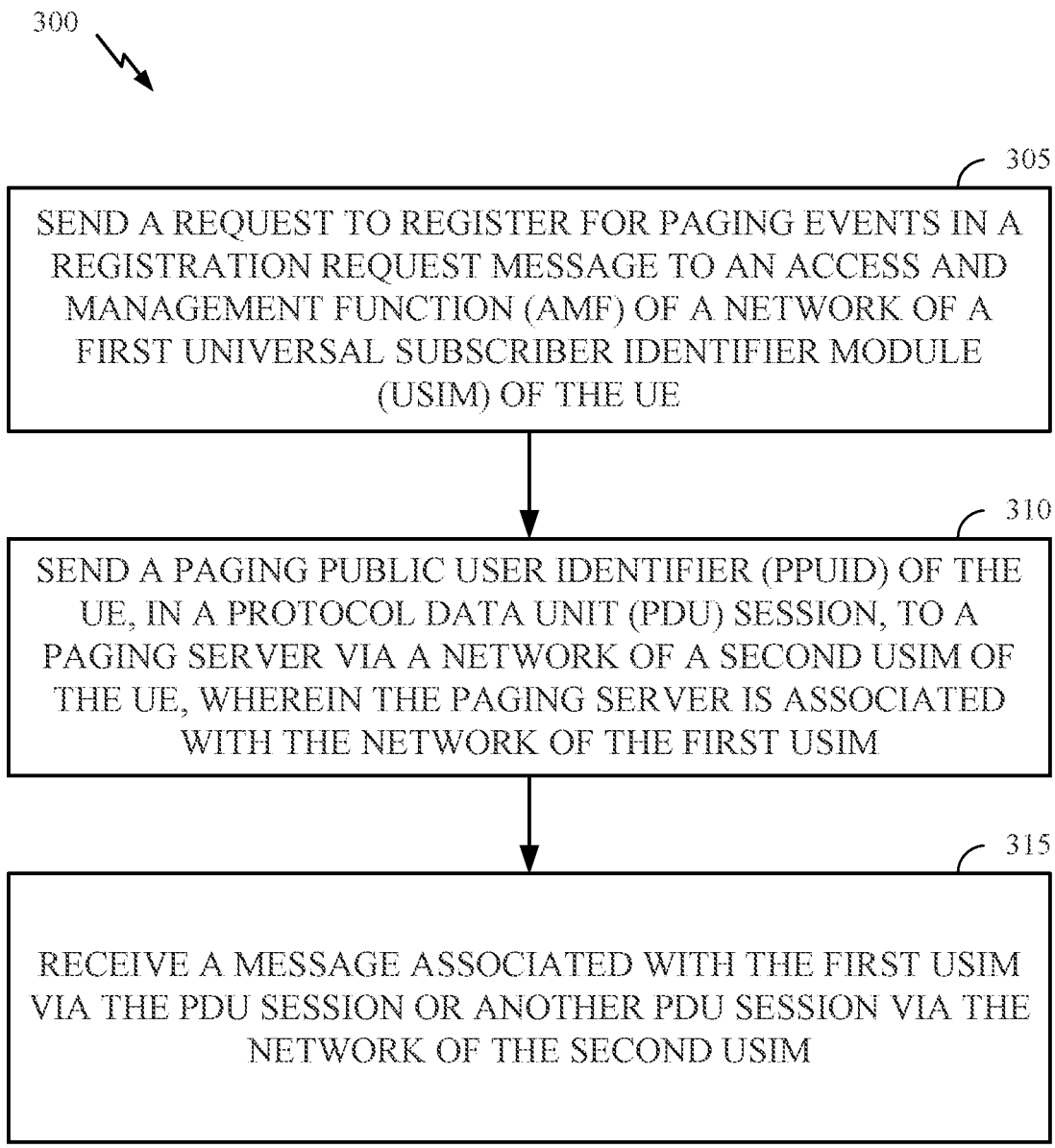
FIG. 3 is a flow diagram illustrating example operations for wireless communication by a UE, in accordance with certain aspects of the present disclosure.

FIG. 3 is a flow diagram illustrating example operations 300 for wireless communication, in accordance with certain aspects of the present disclosure. The operations 300 may be performed, for example, by UE (e.g., such as a UE 120*a* in the wireless communication network 100). Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at block 305, by sending a request to register for paging events a paging public user identifier (PPUID) of the UE in a registration request message to an access and management function (AMF) of a network of a first universal subscriber identifier module (USIM) of the UE.

At block 310, operations 300 continue with sending a paging public user identifier (PPUID) of the UE, in a protocol data unit (PDU) session, to a paging server via a network of a second USIM of the UE, wherein the paging server is associated with the network of the first USIM.

Operations 300 continue at block 315 with receiving a message associated with the first USIM via the PDU session or another PDU session via the network of the second USIM.

According to aspects of the present disclosure, a UE performing operations 300 may determine the PPUID based on a higher-layer operating system (HLOS) identifier (ID) of the UE.

In aspects of the present disclosure, a UE performing operations 300 may determine the PPUID based on an application program identifier (ID) of the UE.

According to aspects of the present disclosure, a UE performing operations 300 may receive the PPUID from a user data manager (UDM) of the network of the first USIM.

In aspects of the present disclosure, the message of block 315 may include a paging message from the paging server.

According to aspects of the present disclosure, the message of block 315 may include a data transmission.

In aspects of the present disclosure, sending the PPUID as in block 310 may include sending the PPUID in a paging coordination container.

According to aspects of the present disclosure, a UE performing operations 300 may refrain from monitoring the network of the first USIM for a period longer than a configured discontinuous reception (DRX) cycle of the UE, subsequent to sending the PPUID to the paging server and prior to receiving the message.

In aspects of the present disclosure, techniques are provided for a UE to register for paging coordination, enabling a multi-USIM UE to receive pages from a network of a first USIM while listening on a network of a second USIM. The registration of the UE for paging coordination may include registering a paging public user identifier (PPUID) by which a UE may be identified for paging by multiple network entities and applications. The UE may provide the PPUID, or a user data manager may provide the PPUID. According to aspects of the present disclosure, a centralized access and mobility management function (AMF) may be selected (e.g., by a network controller) to provide access and mobility management functions to the UE. In aspects of the present disclosure, the UE avoids listening for paging and performing mobility registration updates on a first network while maintaining a connection (e.g., in connected mode) on a second network. An AMF of the first network may send a push notification via the second network to the UE when the AMF has data or a paging message to deliver to the UE. If the UE receives the push notification, the UE may determine to send a non-access stratum message via the first network to the AMF to recover the signaling connection. The UE may determine to continue communicating via the second network, possibly receiving data packets from According to aspects of the present disclosure, a UE may provide the above-described PPUID.

Figure 4:
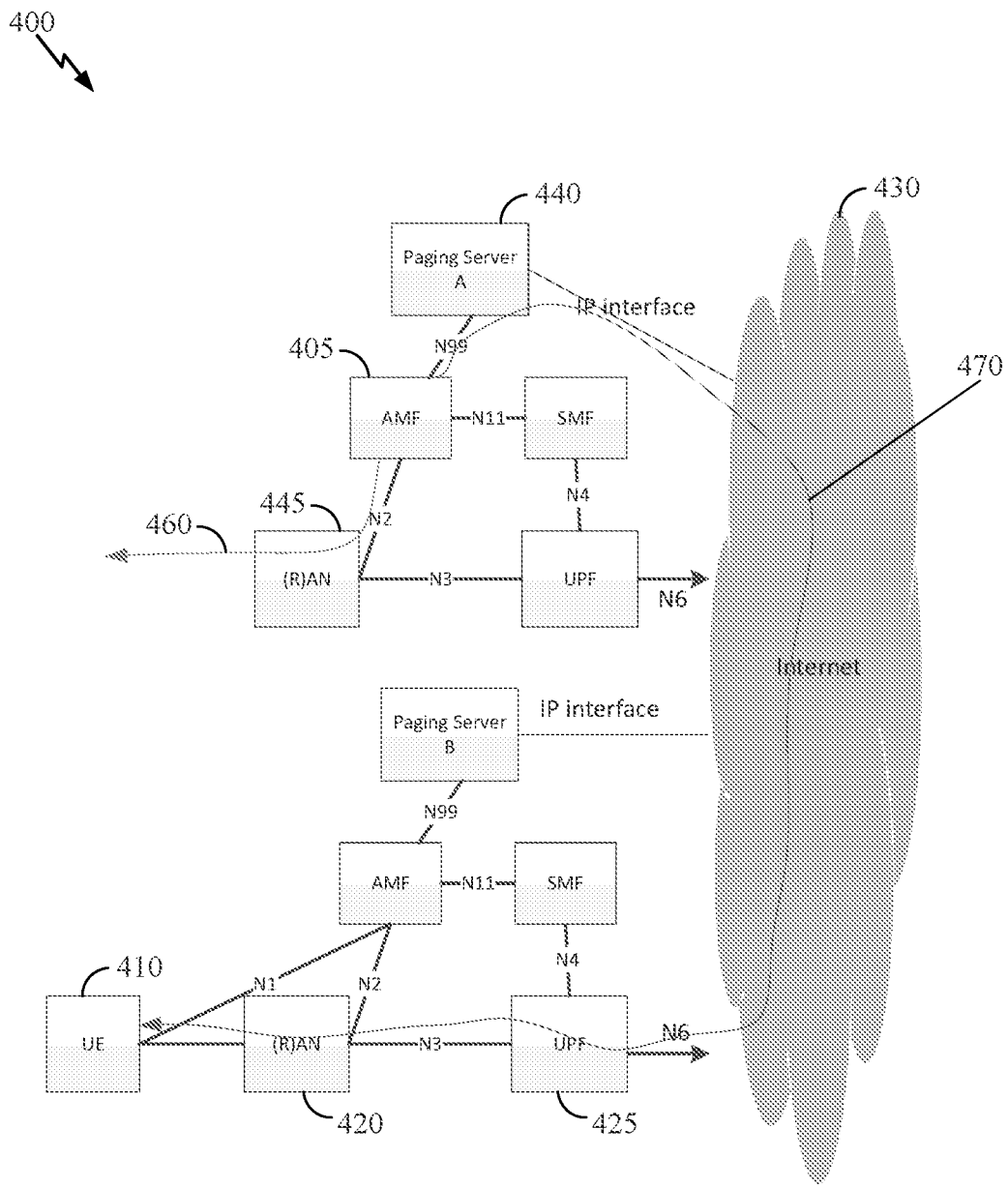
FIG. 4 is a network architecture, according to aspects of the present disclosure

FIG. 4 is a network architecture 400 illustrating operation of a UE 410, radio access network (RAN) 420, user plane function (UPF) 425, Internet 430, paging server 440, RAN 445, and AMF 450, according to aspects of the present disclosure. According to aspects of the present disclosure, the UE has previously registered with the AMF 405 and the paging server 440 for paging coordination. When the AMF obtains data for the UE, the AMF does not send a paging request to the RAN 445, as illustrated at 460. Instead, according to aspects of the present disclosure, the AMF sends a paging request to the paging server 440, which sends a paging request via the internet to the UPF 425 and RAN 420, as shown at 470. The RAN 420 then pages the UE.

In aspects of the present disclosure, upper layers (i.e., a high-layer operating system (HLOS)) send or provide the paging public user ID to the lower layer (i.e., non-access stratum (NAS)) for USIM A (i.e., a first USIM) of the UE. The UE may determine the PPUID based on a HLOS ID of the UE.

According to aspects of the present disclosure, a UE (e.g., UE 410 in FIG. 4) indicates to the AMF that the UE wants to register for paging coordination events during a registration procedure with the AMF. The UE may also include a paging coordination container in the registration procedure. The paging coordination container may include the PPUID.

In aspects of the present disclosure, the paging application container is used to transmit the PPUID between UE and a paging server (e.g., paging server 440) and is transparent to the AMF. The AMF may store the paging application container but may not know the meaning of the container.

According to aspects of the present disclosure, a PPUID is used by a paging server (e.g., paging server 440) to perform coordination paging. The PPUID may be a Google™ ID or an application (e.g., Facebook™) ID if the coordination paging service is provided by an Android™ or IOS operating system, or the PPUID may be an application ID if the service is provided by an application.

In aspects of the present disclosure, an AMF for a network of the first USIM may acknowledge the UE request to register for paging coordination events and indicates to the UE an address (e.g., a network access identifier (NAI) or uniform resource identifier (URI)) of a paging server for that network.

According to aspects of the present disclosure, upper layers (e.g., HLOS) may send the PPUID to the lower layer (e.g., NAS) for USIM B (i.e., a second USIM) of the UE. USIM B may register the paging coordination events to paging server A via a PDU session to with paging server A (e.g., paging server 440).

In aspects of the present disclosure, a UE and a paging server can support user plane signaling, e.g., signaling using HTTP protocol.

According to aspects of the present disclosure, a user data manager (UDM) may provide the PPUID to the UE.

Figure 5:
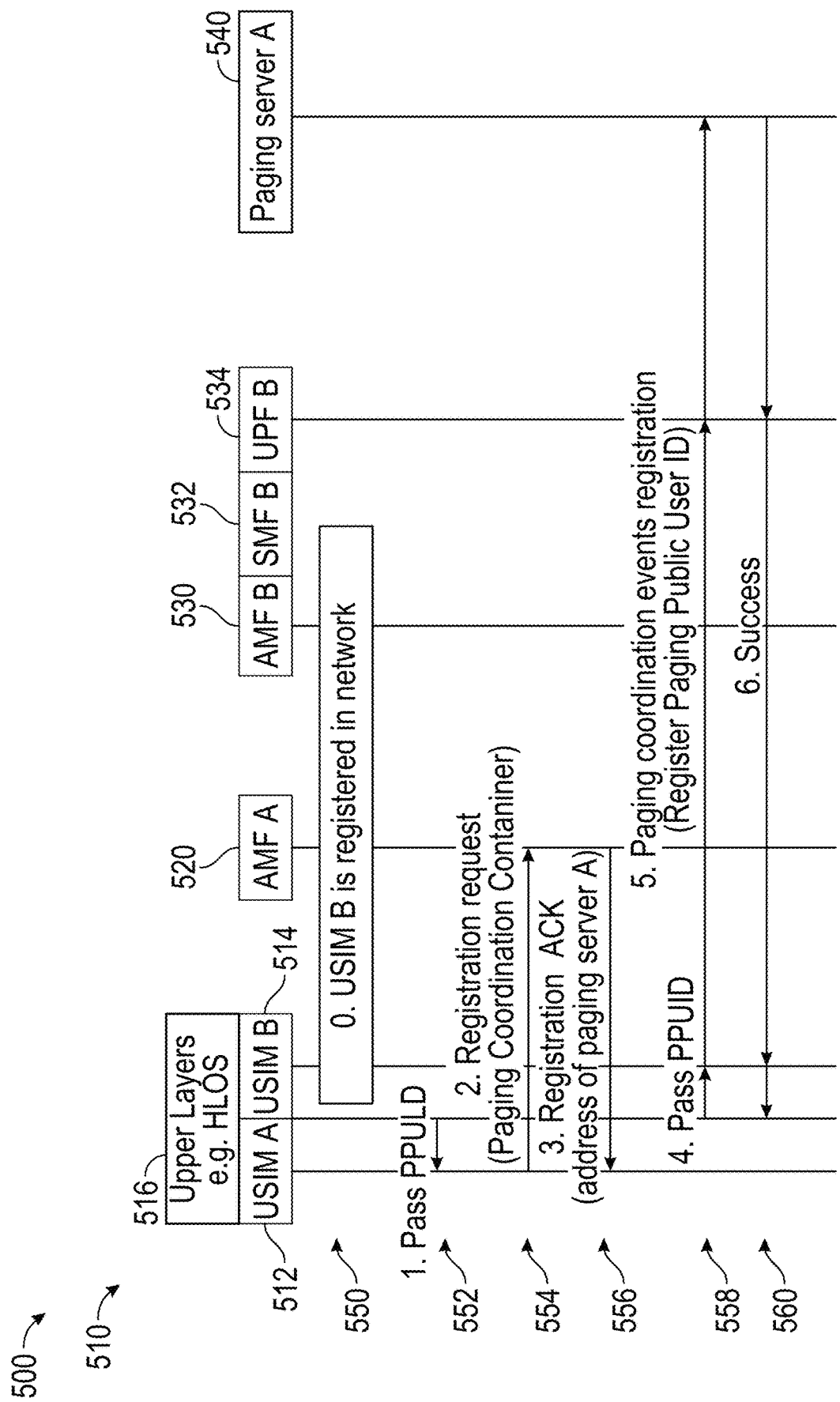
FIG. 5 is a call flow diagram illustrating communications in which a UE provides a paging public user identifier (PPUID), in accordance with certain aspects of the present disclosure.

FIG. 5 is a call flow 500 illustrating communications between a UE 510, an AMF 520 of a network associated with a first USIM 512 of the UE, an AMF 530 of a network associated with a second USIM 514 of the UE, a service management function (SMF) 532 of the network associated with the second USIM of the UE, a user plane function (UPF) 534 of the network associated with the second USIM of the UE, and a paging server 540 of the network associated with the first USIM of the UE, according to aspects of the present disclosure. At 550, the UE is registered with the network via the second USIM 514. At 552, upper layers 516 pass (e.g., down a protocol stack) a PPUID of the UE to the first USIM. The UE sends a registration request with a paging coordination container to the AMF 520 of the network associated with the first USIM at 554. At 556, the AMF 520 of the network associated with the first USIM returns a registration acknowledgment (ACK) including an address of the paging server 540. Upon receiving the registration ACK, the upper layers pass the PPUID to the second USIM, which then sends a paging coordination events registration request to register the PPUID to the address of the paging server 540 via the UPF 534, at 558. At 560, the paging server 540 returns a success message to the UE via the UPF 534 and the second USIM 514.

In aspects of the present disclosure, a UE (e.g., the UE 510) indicates to an AMF (e.g., the AMF 520) that the UE wants to register for paging events during a registration procedure with the AMF.

According to aspects of the present disclosure, a UDM may store a mapping between a subscription permanent identifier (SUPI) of the UE and PPUID. The UDM may provide the PPUID related to a SUPI to an AMF.

In aspects of the present disclosure, an AMF may send a registration acceptance message to a first USIM (e.g., USIM 512) of a UE with the PPUID.

According to aspects of the present disclosure, lower layers (e.g., NAS) of a protocol stack of a first USIM (e.g., USIM 512) may pass the paging public user ID to upper layers (e.g., HLOS) of the protocol stack of the UE.

In aspects of the present disclosure, the upper layers (e.g., HLOS) may send the PPUID to a lower layer (NAS) of a protocol stack of a second USIM (e.g., USIM 514). The second USIM may register the paging coordination events with paging server A via a PDU session to paging server A.

According to aspects of the present disclosure, a UE and a paging server may support user plane signaling, e.g., via hypertext transfer protocol (HTTP).

Figure 6:
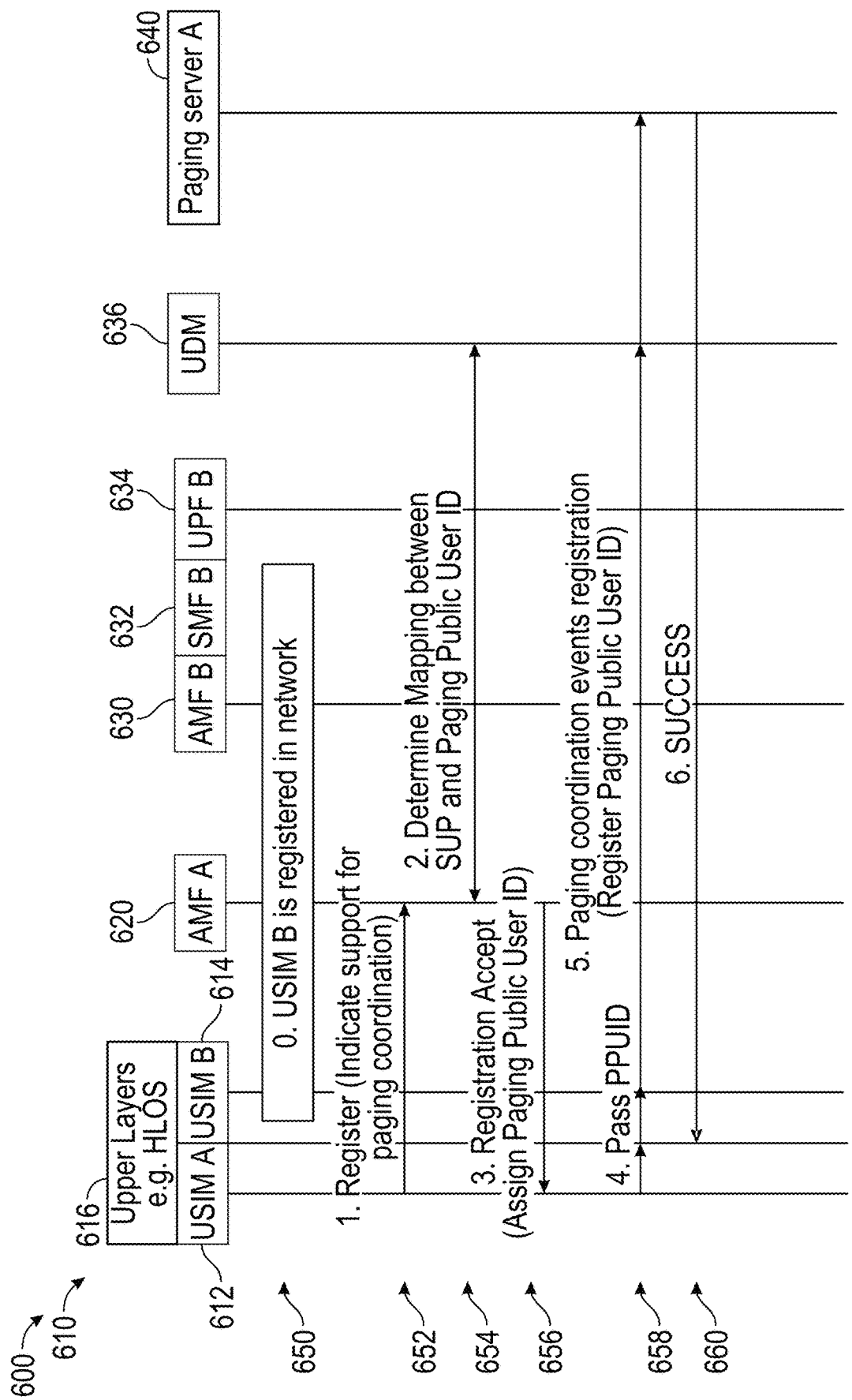
FIG. 6 is a call flow diagram illustrating communications in which a user data manager provides a paging public user identifier (PPUID), in accordance with certain aspects of the present disclosure.

FIG. 6 is a call flow 600 illustrating communications between a UE 610, an AMF 620 of a network associated with a first USIM 612 of the UE, an AMF 630 of a network associated with a second USIM 614 of the UE, a service management function (SMF) 632 of the network associated with the second USIM of the UE, a user plane function (UPF) 634 of the network associated with the second USIM of the UE, a UDM 636, and a paging server 640 of the network associated with the first USIM of the UE, according to aspects of the present disclosure. At 650, the UE is registered with the network via the second USIM 614. At 652, the UE sends a registration request indicating support for paging coordination to the AMF 620 of the network associated with the first USIM. The AMF 620 requests the mapping of the SUPI of the UE to a PPUID of the UE from the UDM 636 at 654. At 656, the AMF 620 of the network associated with the first USIM returns a registration acceptance including an address of the paging server 640 and the PPUID. Upon receiving the registration acceptance, the first USIM 612 passes the PPUID and paging server address to the upper layers 616 of the UE, which pass the PPUID and the paging server address to the second USIM 614, which then sends a paging coordination events registration request to register the PPUID to the address of the paging server 640 via the UPF 634, at 658. At 660, the paging server 640 returns a success message to the UE via the UPF 634 and the second USIM 614.

Figure 7:
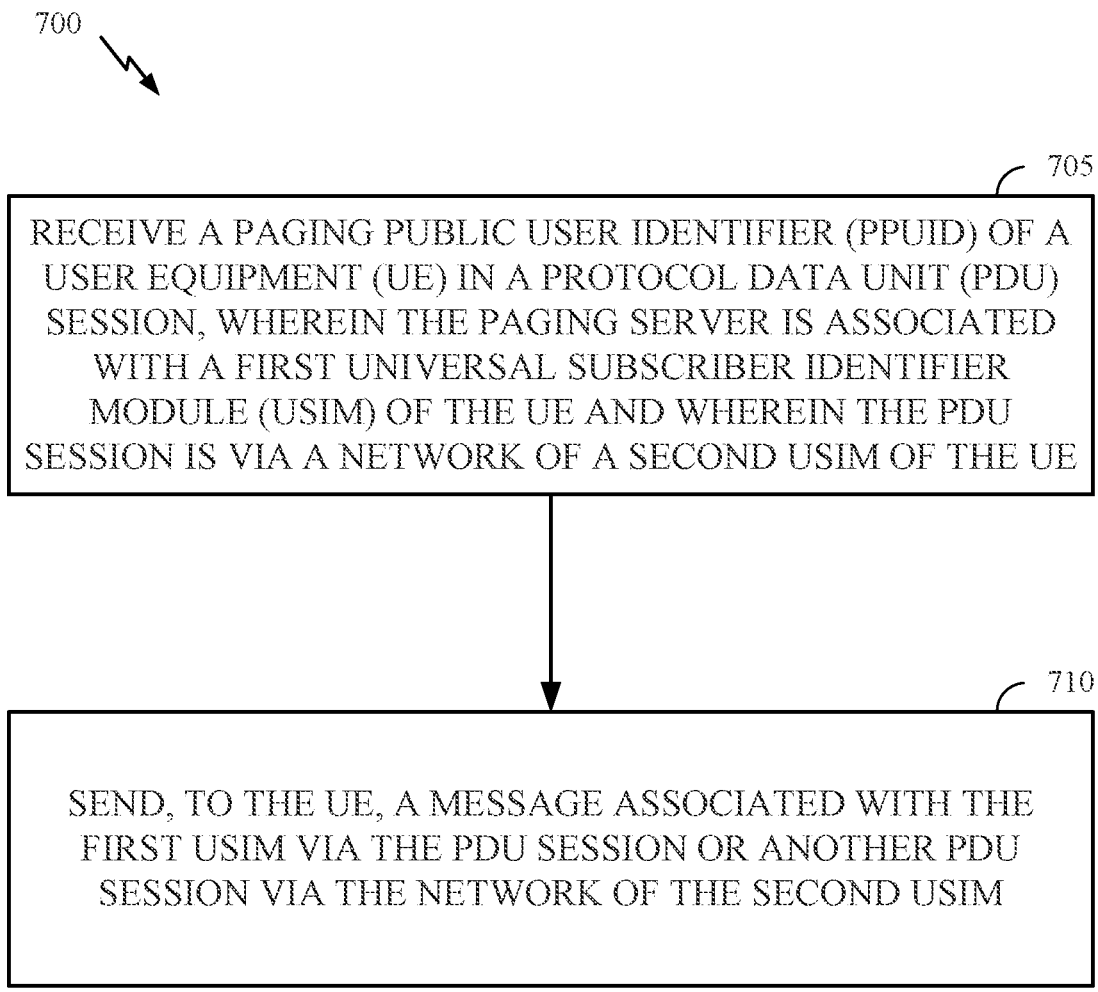
FIG. 7 is a flow diagram illustrating example operations for wireless communication that may be performed by a paging server, in accordance with certain aspects of the present disclosure.

FIG. 7 is a flow diagram illustrating example operations 700 for wireless communication, in accordance with certain aspects of the present disclosure. The operations 700 may be performed, for example, by a paging server in a BS (e.g., such as the BS 110*a* in the wireless communication network 100). The operations 700 may be complimentary operations by the BS to the operations 300 performed by the UE. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at block 705, by receiving a paging public user identifier (PPUID) of a user equipment (UE) in a protocol data unit (PDU) session, wherein the paging server is associated with a first universal subscriber identifier module (USIM) of the UE and wherein the PDU session is via a network of a second USIM of the UE.

At block 710, operations 700 continue sending, to the UE, a message associated with the first USIM via the PDU session or another PDU session via the network of the second USIM.

According to aspects of the present disclosure, the PPUID of block 705 may be determined based on a higher-layer operating system (HLOS) identifier (ID) of the UE.

In aspects of the present disclosure, the PPUID of block 705 may be determined based on an application program identifier (ID) of the UE.

According to aspects of the present disclosure, the PPUID of block 705 may be determined by a user data manager (UDM) of the network of the first USIM.

In aspects of the present disclosure, the message of block 710 may include a paging message.

According to aspects of the present disclosure, the message of block 710 may include a push notification, and the paging server may receive the push notification from an access management function (AMF) of the network of the first USIM.

In aspects of the present disclosure, receiving the PPUID as in block 705 may include receiving the PPUID in a paging coordination container.

Figure 8:
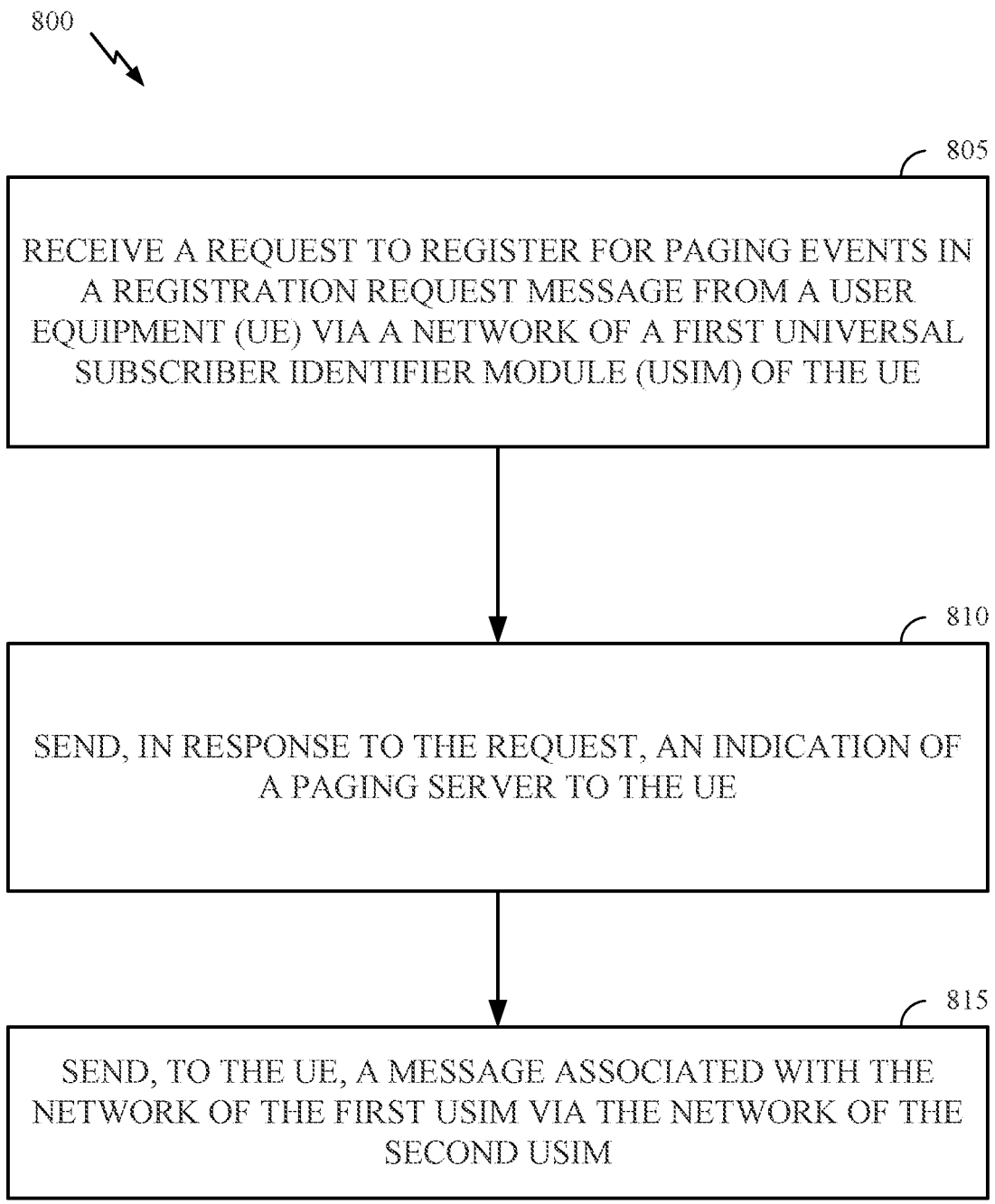
FIG. 8 is a flow diagram illustrating example operations for wireless communication that may be performed by an access and mobility management function (AMF) in a BS, in accordance with certain aspects of the present disclosure.

FIG. 8 is a flow diagram illustrating example operations 800 for wireless communication, in accordance with certain aspects of the present disclosure. The operations 800 may be performed, for example, by an access and mobility management function (AMF) in a BS (e.g., such as the BS 110*a* in the wireless communication network 100). The operations 800 may be complimentary operations by the BS to the operations 300 performed by the UE. Operations 800 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at block 805, by receiving a request to register for paging events in a registration request message from a user equipment (UE) via a network of a first universal subscriber identifier module (USIM) of the UE.

At block 810, operations 800 continue by sending, in response to the request, an indication of a paging server to the UE.

Operations 800 continue at block 815 with sending, to the UE, a message associated with the network of the first USIM via the network of the second USIM.

According to aspects of the present disclosure, the message of block 815 may include a paging message.

In aspects of the present disclosure, the message of block 815 may include a push notification:

According to aspects of the present disclosure, the request of block 805 may include a paging public user identifier (PPUID) in a paging coordination container.

In aspects of the present disclosure, the first response message of block 410 may be a first medium access control (MAC) control element (CE), and the BS may send a second MAC CE to the UE replying to the first response message. The PPUID may be determined based on a higher-layer operating system (HLOS) identifier (ID) of the UE, an application program identifier (ID) of the UE, or by a UDM of the network of the first USIM.

According to aspects of the present disclosure, for a UE that registers for paging coordination events, the network may decide to select a centralized AMF to serve the UE. In this case, after receiving a registration request message (e.g., at 554 in FIG. 5 or at 652 in FIG. 6), an initial AMF may trigger an AMF re-allocation procedure as described in clause 4.2.2.2.3 in TS 23.502, which is publicly available from www.3gpp.org.

In aspects of the present disclosure, after receiving a paging coordination event registration success message (e.g., at 560 in FIG. 5 or at 660 in FIG. 6), a UE may turn (e.g., retune) to a network associated with a second USIM. The UE may stay in the network associated with the second USIM without moving to the network associated with the first USIM, if no paging on the network associated with the first USIM is received. Thus, the UE may avoid listening for paging and performing mobility registration update procedures on the network associated with the first USIM.

According to aspects of the present disclosure, when downlink (DL) data is received in a UPF for the UE to receive via the first USIM, the UPF may initiate extended buffering for the UE. The UPF may also initiate a timer with a relatively long value to decide whether the buffered data in UPF is valid for delivery to the UE.

If a downlink data notification (DDN) is received in an AMF for the first USIM, then the AMF may sends the Push notification with PPUID to paging server A. Paging server sends the push notification to USIM B via user plane connection.

Figure 9:
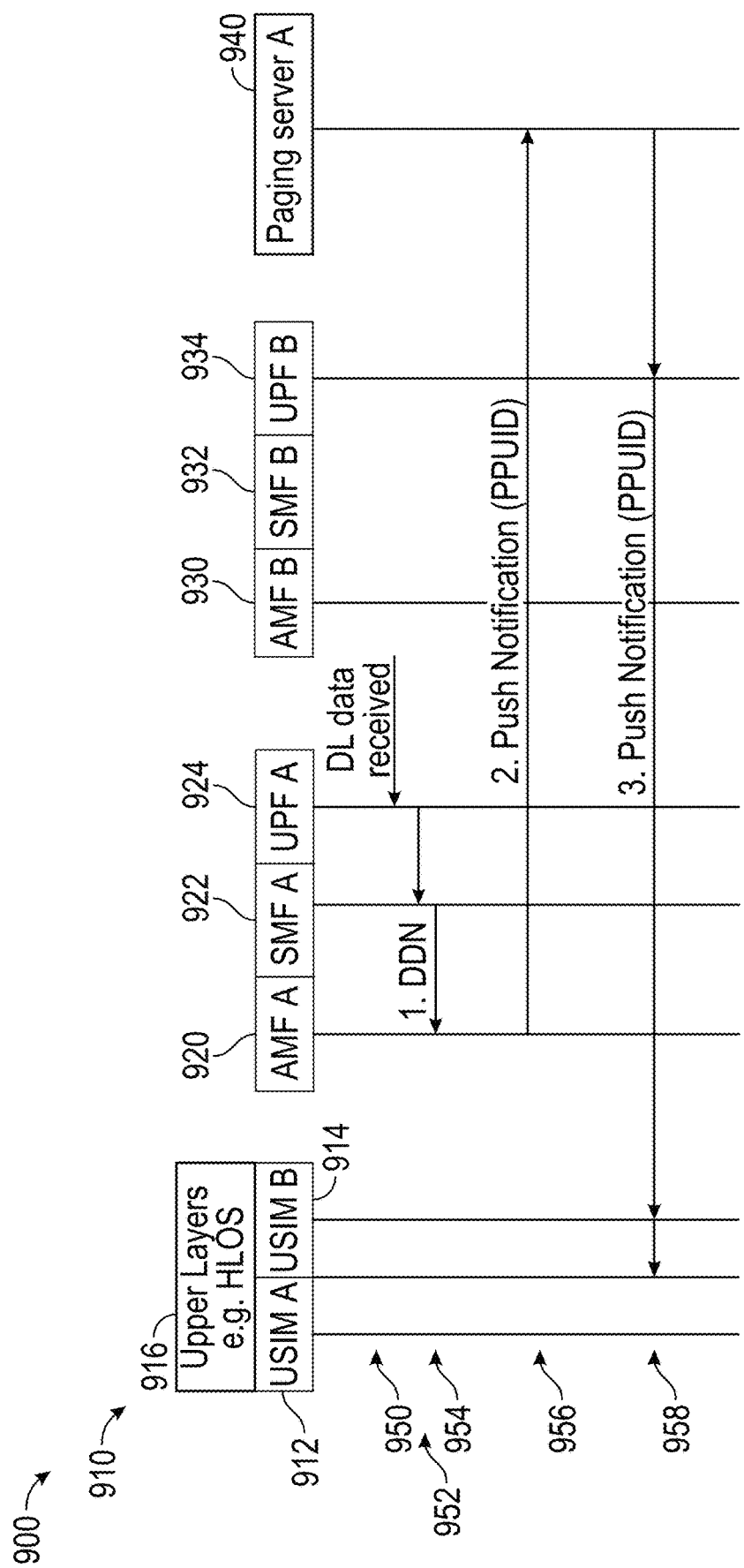
FIG. 9 is a call flow illustrating communications wherein a UE receives a push notification, in accordance with certain aspects of the present disclosure.

FIG. 9 is a call flow 900 illustrating communications between a UE 910, an AMF 920 of a network associated with a first USIM 912 of the UE, a service management function (SMF) 922 of the network associated with the first USIM of the UE, a user plane function (UPF) 924 of the network associated with the first USIM of the UE, an AMF 930 of a network associated with a second USIM 914 of the UE, a service management function (SMF) 932 of the network associated with the second USIM of the UE, a user plane function (UPF) 934 of the network associated with the second USIM of the UE, and a paging server 940 of the network associated with the first USIM of the UE, according to aspects of the present disclosure. At 950, the UE has already registered for paging coordination with the network via the second USIM 914 when the UPF of the network associated with the first USIM obtains downlink data for the UE. At 952, the UPF sends a notification regarding the data to the SMF 922 of the network associated with the first USIM. The SMF 922 sends a notification and the data to AMF 920 at 954. At 956, the AMF 920 of the network associated with the first USIM sends a push notification regarding the downlink data with the PPUID of the UE to the paging server 940. Upon receiving the push notification, the paging server 940 sends the push notification, with the PPUID, to the UPF 934 associated with the network of the second USIM 914 of the UE, which contacts the second USIM regarding the downlink data at 958. The second USIM passes the notification to upper layers 916 of the UE.

According to aspects of the present disclosure, when a UE receives a push notification (e.g., at 958 in FIG. 9) via a user plane for a second USIM, if the UE decides to continue by requesting network service via the first USIM, then the UE will turn away (e.g., retune) to the network associated with the first USIM and send a NAS message to an AMF of the network associated with the first USIM in order to recover the signaling connection to that network.

In aspects of the present disclosure, if the UE moves or has moved out of the registration area allocated for the network associated with the first USIM, then the first USIM may send the registration area with active flag to the AMF. After the registration procedure, the UE may then send a service request (SR) with paging response.

According to aspects of the present disclosure, if UE is still within the registration area allocated for the network associated with the first USIM, then the first USIM may directly send a service request NAS message to the AMF.

In aspects of the present disclosure, if a centralized AMF is or has been selected to serve the UE, then the centralized AMF may allocate to the UE a registration area with "all PLMN;" in this case, when the UE turns back to the first USIM from the second USIM, the UE may send a service request NAS message to the AMF directly.

Figure 10:
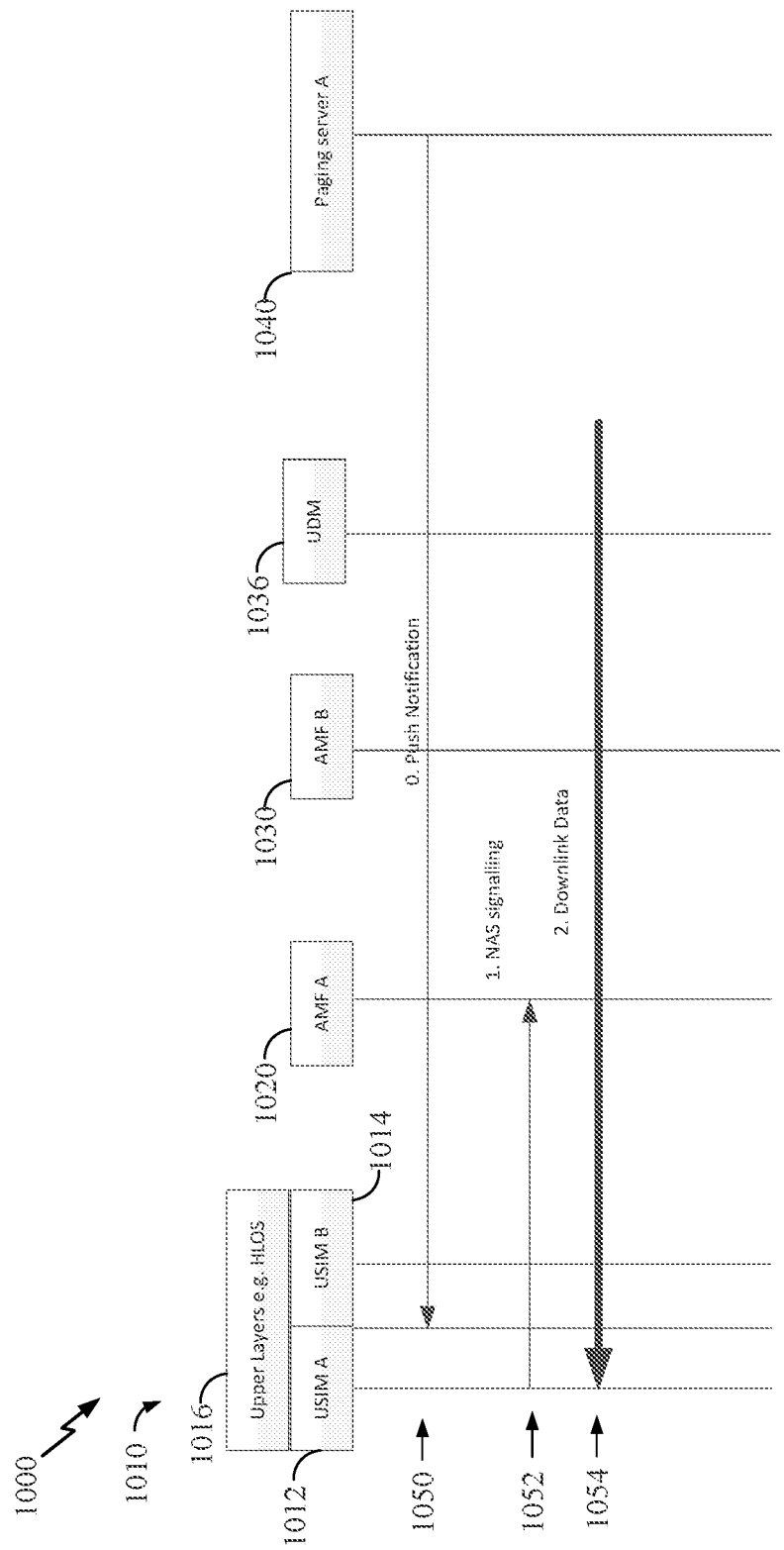
FIG. 10 is a call flow illustrating communications wherein a UE responds to a push notification, in accordance with certain aspects of the present disclosure

FIG. 10 is a call flow 1000 illustrating communications between a UE 1010, an AMF 1020 of a network associated with a first USIM 1012 of the UE, an AMF 1030 of a network associated with a second USIM 1014 of the UE, a UDM 1036 of the network associated with the second USIM of the UE, and a paging server 1040 of the network associated with the first USIM of the UE, according to aspects of the present disclosure. At 1050, the UE receives a push notification from the paging server regarding downlink data for the UE to receive via the network associated with the first USIM 1012. At 1052, the UE transmits NAS signaling to the AMF associated with the first USIM. The UE receives the downlink data at 1054.

Figure 11:
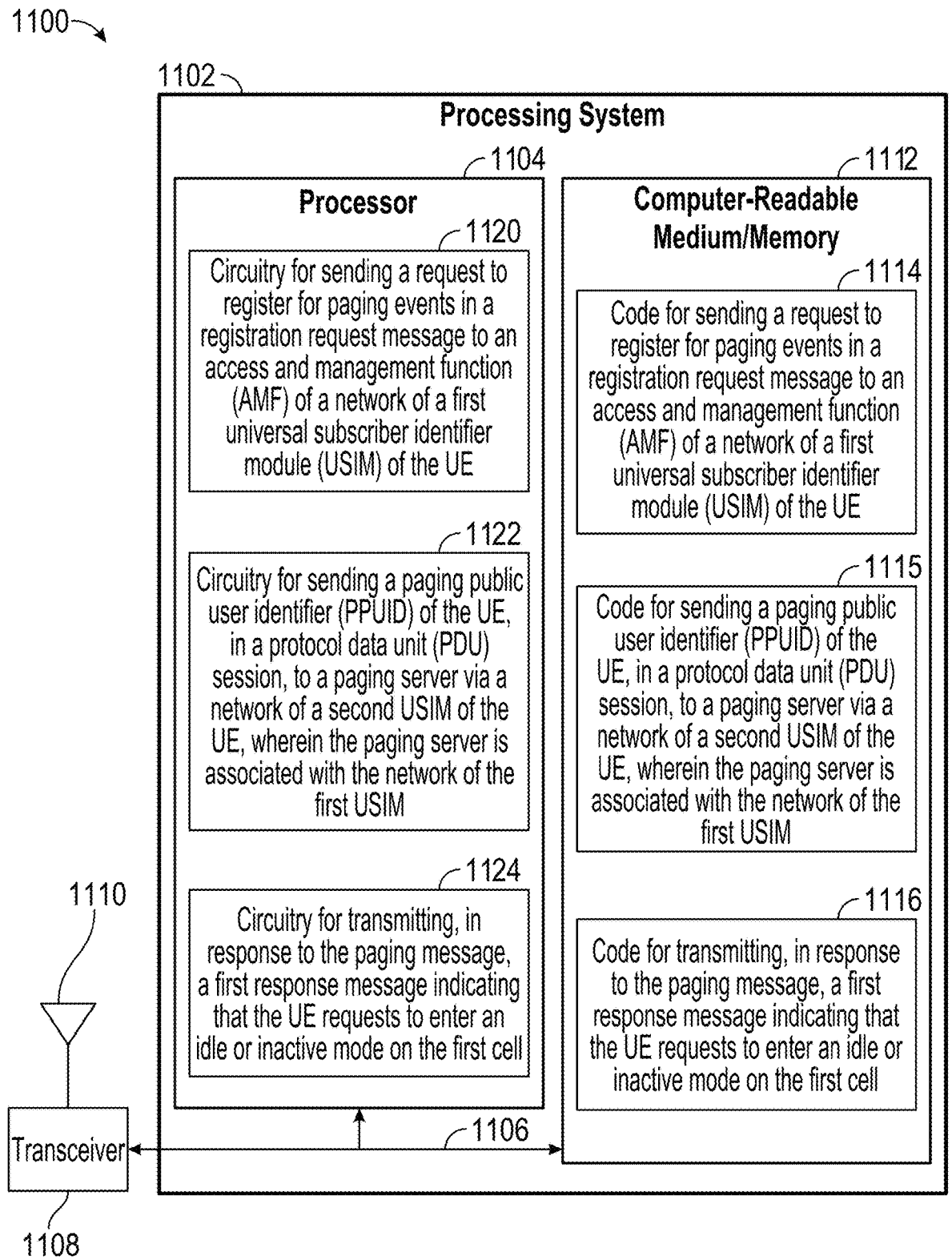
FIG. 11 illustrates a communications device that may include various components configured to perform the operations illustrated in FIG. 3, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 3. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 606. In certain aspects, the computer-readable medium/memory 1112 is configured to store instructions (e.g., computer-executable code) that when executed by the processor 1104, cause the processor 1104 to perform the operations illustrated in FIG. 3, or other operations for performing the various techniques discussed herein for a multi-USIM UE or a C-RAT-capable UE to receive and respond to a page from a network of a first USIM of the UE while not activating a receiver on that network by receiving the page (from the network of the first USIM) on a receiver active on a network of a second USIM. In certain aspects, computer-readable medium/memory 1112 stores code 1114 for sending a request to register for paging events in a registration request message to an access and management function (AMF) of a network of a first universal subscriber identifier module (USIM) of the UE; code 1115 for sending a paging public user identifier (PPUID) of the UE, in a protocol data unit (PDU) session, to a paging server via a network of a second USIM of the UE, wherein the paging server is associated with the network of the first USIM; and code 1116 for receiving a message associated with the first USIM via the PDU session or another PDU session via the network of the second USIM. In certain aspects, the processor 1104 has circuitry configured to implement the code stored in the computer-readable medium/memory 1112. The processor 1104 includes circuitry 1120 for sending a request to register for paging events in a registration request message to an access and management function (AMF) of a network of a first universal subscriber identifier module (USIM) of the UE; circuitry 1122 for sending a paging public user identifier (PPUID) of the UE, in a protocol data unit (PDU) session, to a paging server via a network of a second USIM of the UE, wherein the paging server is associated with the network of the first USIM; and circuitry for receiving a message associated with the first USIM via the PDU session or another PDU session via the network of the second USIM.

Figure 12:
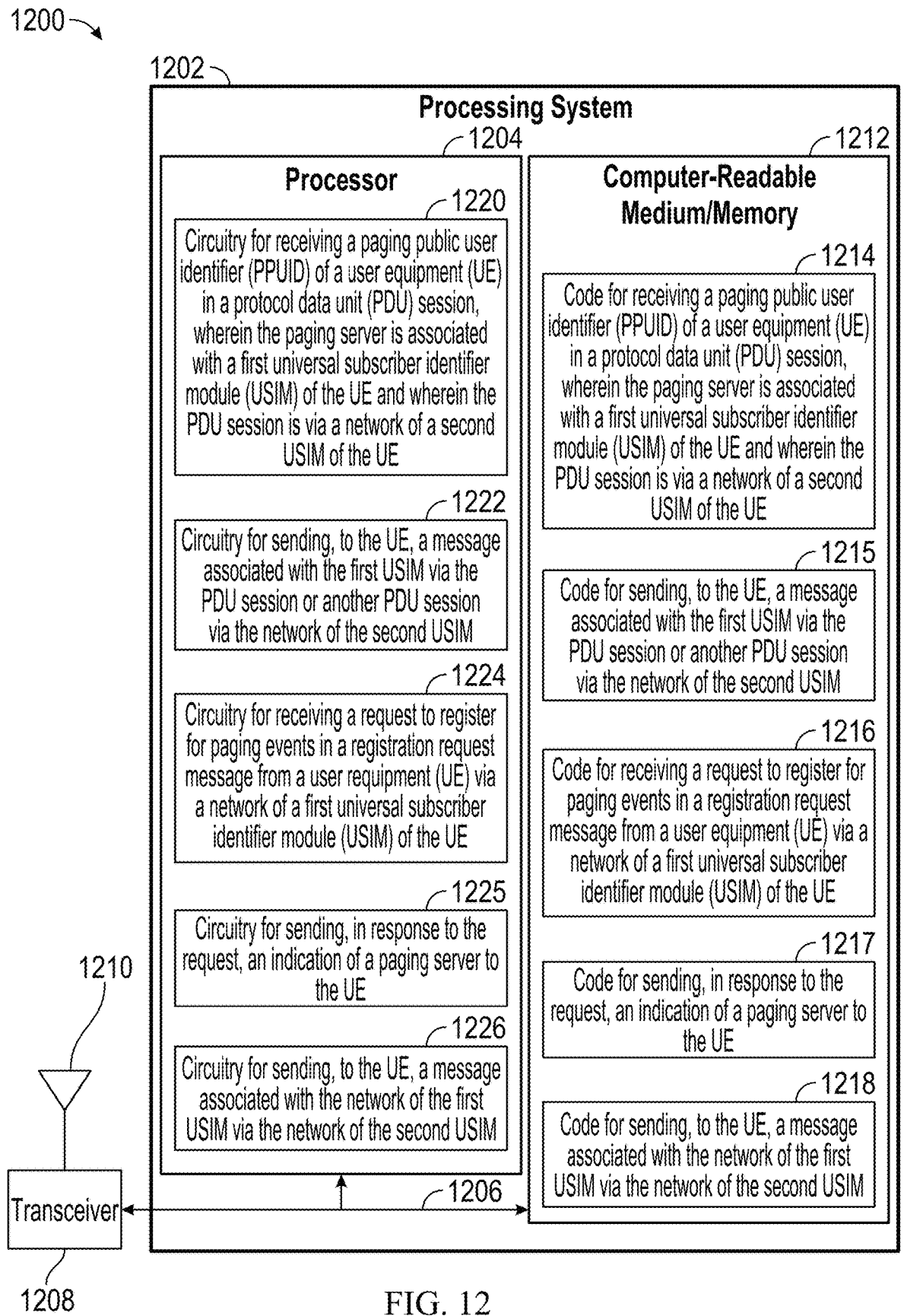
FIG. 12 illustrates a communications device that may include various components configured to perform the operations illustrated in FIGS. 7 & 8, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 7 & 8. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 706. In certain aspects, the computer-readable medium/memory 1212 is configured to store instructions (e.g., computer-executable code) that when executed by the processor 1204, cause the processor 1204 to perform the operations illustrated in FIG. 7, FIG. 8, or other operations for performing the various techniques discussed herein for a multi-USIM UE or a C-RAT-capable UE to receive and respond to a page from a network of a first USIM of the UE while not activating a receiver on that network by receiving the page (from the network of the first USIM) on a receiver active on a network of a second USIM. In certain aspects, computer-readable medium/memory 1212 stores code 1214 for receiving a paging public user identifier (PPUID) of a user equipment (UE) in a protocol data unit (PDU) session, wherein the paging server is associated with a first universal subscriber identifier module (USIM) of the UE and wherein the PDU session is via a network of a second USIM of the UE; code 1215 for sending, to the UE, a message associated with the first USIM via the PDU session or another PDU session via the network of the second USIM; code 1216 for receiving a request to register for paging events in a registration request message from a user equipment (UE) via a network of a first universal subscriber identifier module (USIM) of the UE; code 1217 for sending, in response to the request, an indication of a paging server to the UE; and code 1218 for sending, to the UE, a message associated with the network of the first USIM via the network of the second USIM. In certain aspects, the processor 1204 has circuitry configured to implement the code stored in the computer-readable medium/memory 1212. The processor 1204 includes circuitry 1220 for receiving a request to register for paging events in a registration request message from a user equipment (UE) via a network of a first universal subscriber identifier module (USIM) of the UE; circuitry 1222 for sending, to the UE, a message associated with the first USIM via the PDU session or another PDU session via the network of the second USIM; and circuitry 1224 for receiving a request to register for paging events in a registration request message from a user equipment (UE) via a network of a first universal subscriber identifier module (USIM) of the UE; circuitry 1225 for sending, in response to the request, an indication of a paging server to the UE; and circuitry 1226 for sending, to the UE, a message associated with the network of the first USIM via the network of the second USIM.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3, 7, and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications performed by a user equipment (UE), the method comprising:
sending a request to register for paging events in a registration request message to an access and management function (AMF) of a network of a first universal subscriber identifier module (USIM) of the UE;
sending a paging public user identifier (PPUID) of the UE, in a protocol data unit (PDU) session, to a paging server via a network of a second USIM of the UE, wherein the PPUID is mapped to a subscription permanent identifier (SUPI) of the UE, and wherein the paging server is associated with the network of the first USIM; and
receiving a message associated with the first USIM via the PDU session or another PDU session via the network of the second USIM.

2. The method of claim 1, wherein the request to register for paging events comprises the PPUID of the UE.

3. The method of claim 2, wherein the request to register for paging events includes the PPUID in a paging coordination container.

4. The method of claim 1, further comprising determining the PPUID based on a higher-layer operating system (HLOS) identifier (ID) of the UE.

5. The method of claim 1, further comprising determining the PPUID based on an application program identifier (ID) of the UE.

6. The method of claim 1, further comprising receiving the PPUID from a user data manager (UDM) of the network of the first USIM.

7. The method of claim 1, wherein the message comprises a paging message from the paging server.

8. The method of claim 1, wherein the message comprises a data transmission.

9. The method of claim 1, wherein sending the PPUID comprises sending the PPUID in a paging coordination container.

10. The method of claim 1, further comprising refraining from monitoring the network of the first USIM for a period longer than a configured discontinuous reception (DRX) cycle of the UE, subsequent to sending the PPUID to the paging server and prior to receiving the message.

11. A method for wireless communications performed by a paging server, the method comprising:
receiving a paging public user identifier (PPUID) of a user equipment (UE) in a protocol data unit (PDU) session, wherein the PPUID is mapped to a subscription permanent identifier (SUPI) of the UE, wherein the paging server is associated with a first universal subscriber identifier module (USIM) of the UE, and wherein the PDU session is via a network of a second USIM of the UE; and
sending, to the UE, a message associated with the first USIM via the PDU session or another PDU session via the network of the second USIM.

12. The method of claim 11, wherein the message comprises a paging message.

13. The method of claim 11, wherein the message comprises a push notification, and wherein the method further comprises receiving the push notification from an access and mobility management function (AMF) of the network of the first USIM.

14. The method of claim 11, wherein receiving the PPUID comprises receiving the PPUID in a paging coordination container.

15. A method for wireless communications performed by an access and management function (AMF), the method comprising:
receiving a request to register for paging events in a registration request message from a user equipment (UE) via a network of a first universal subscriber identifier module (USIM) of the UE;
receiving, from the UE or from a user data manager (UDM), a paging public user identifier (PPUID) of the UE, wherein the PPUID is mapped to a subscription permanent identifier (SUPI) of the UE
sending, in response to the request, an indication of a paging server to the UE; and
sending, to the UE, a message associated with the network of the first USIM via the network of the second USIM.

16. The method of claim 15, wherein the message comprises a paging message.

17. The method of claim 15, wherein the message comprises a push notification.

18. The method of claim 15, wherein the request comprises PPUID in a paging coordination container.

19. The method of claim 18, wherein the PPUID is received from the UDM of the network of the first USIM.

\* \* \* \* \*